US008065302B2

(12) United States Patent
Sridhar et al.

(10) Patent No.: US 8,065,302 B2
(45) Date of Patent: Nov. 22, 2011

(54) SYSTEM AND METHOD FOR ANNOTATION AGGREGATION

(75) Inventors: Varadarajan Sridhar, Bangalore (IN); Srividya Gopalan, Bangalore (IN); Amit Thawani, Bangalore (IN)

(73) Assignee: Satyam Computer Services Limited, Secunderabad (IN)

( * ) Notice: Subject to any disclaimer, the term of this patent is extended or adjusted under 35 U.S.C. 154(b) by 481 days.

(21) Appl. No.: 12/199,495

(22) Filed: Aug. 27, 2008

(65) Prior Publication Data

US 2010/0057699 A1 Mar. 4, 2010

(51) Int. Cl.
*G06F 7/00* (2006.01)
*G06F 17/30* (2006.01)
(52) U.S. Cl. ......... 707/736; 707/748; 707/756; 707/913
(58) Field of Classification Search .................. 707/736, 707/739, 748, 754, 755, 756, 913, 917
See application file for complete search history.

(56) References Cited

U.S. PATENT DOCUMENTS

| | | | |
|---|---|---|---|
| 6,564,263 B1 | 5/2003 | Bergman et al. | |
| 6,697,818 B2* | 2/2004 | Li et al. ................................. | 1/1 |
| 6,961,954 B1 | 11/2005 | Maybury et al. | |
| 6,996,171 B1* | 2/2006 | Walker et al. ............ | 375/240.09 |
| 7,340,458 B2 | 3/2008 | Vaithilingam et al. | |
| 7,398,261 B2 | 7/2008 | Spivack et al. | |
| 7,409,357 B2* | 8/2008 | Schaf et al. ................... | 705/7.28 |
| 7,668,718 B2* | 2/2010 | Kahn et al. ..................... | 704/270 |
| 7,672,378 B2* | 3/2010 | Ng et al. ..................... | 375/240.26 |
| 7,685,198 B2* | 3/2010 | Xu et al. ........................ | 707/748 |
| 7,835,578 B2* | 11/2010 | Cheng et al. .................. | 382/176 |
| 2007/0273696 A1* | 11/2007 | Cheng et al. .................. | 345/467 |
| 2009/0274434 A1* | 11/2009 | Mei et al. .......................... | 386/52 |
| 2010/0293048 A1* | 11/2010 | Singolda et al. ........... | 705/14.43 |

OTHER PUBLICATIONS

Shaw, et al., "Web-Style Multimedia Annotations", UC Berkeley), UCB iSchool Report 2007-014, Aug. 2007, Available at http://dret.net/netdret/publications#wi107k.
Motta, et al., "Next Generation Semantic Web Applications", Proceedings of the Semantic Web—ASWC 2006, First Asian Semantic Web Conference, Beijing, China, Sep. 3-7, 2006, Lecture Notes in Computer Science, vol. 4185, 2006.
Song, et al., "Semi-Automatic Video Semantic Annotation Based on Active Learning", Proceedings of Visual Communications and Image Processing 2005, Proc. of SPIE, vol. 5960, Beijing, China, Jul. 12-15, 2005.

(Continued)

*Primary Examiner* — Don Wong
*Assistant Examiner* — Merilyn Nguyen
(74) *Attorney, Agent, or Firm* — Merek, Blackmon & Voorhees, LLC

(57) ABSTRACT

Annotations for a multimedia repository facilitate an efficient indexing, searching, and retrieval of the content from the multimedia repository. These annotations are an effective description of the content and it is very useful to have systems that automatically analyze the content to generate the annotations. A multimedia content, comprising video, audio, and textual data, is organized at shot level, scene level, segment level, multi-segment level, and full-length level. The multimedia content annotation is a providing of computer processable description of the multimedia content. Due to the multi-level organization of a multimedia content, it is required to provide annotations at various levels as well. A system and method for annotation aggregation uses the annotation at a lower level to arrive at an annotation at the next higher level. Such multilevel annotations are very useful in applications such as targeted content delivery.

7 Claims, 8 Drawing Sheets

ANNOTATION AGGREGATION SYSTEM

OTHER PUBLICATIONS

Declerck, et al., "Text-Based Semantic Annotation Service for Multimedia Content in the Esperonto Project", Proceedings of the European Workshop on the Integration of Knowledge, Semantic and Digital Media Technologies (EWIMT 2004), Nov. 25-26, 2004, London.

Marques, et al., "Semi-Automatic Semantic Annotation of Images Using Machine Learning Techniques", Proceedings of International Semantic Web Conference (ISWC), Samibel Island, FL, Oct. 20-23, 2003.

Yang, et al., "MECA: An Extensible, Expressive System and Language for Statically Checking Security Properties", Proceedings of the $10^{th}$ ACM Conference on Computer and Communications Security (CCS'03), Oct. 27-31, 2003, Washington, DC, USA.

Sridhar, et al., "System and Method for Bounded Analysis of Multimedia Using Multiple Correlations", U.S. Appl. No. 12/194,787, filed Aug. 20, 2008.

* cited by examiner

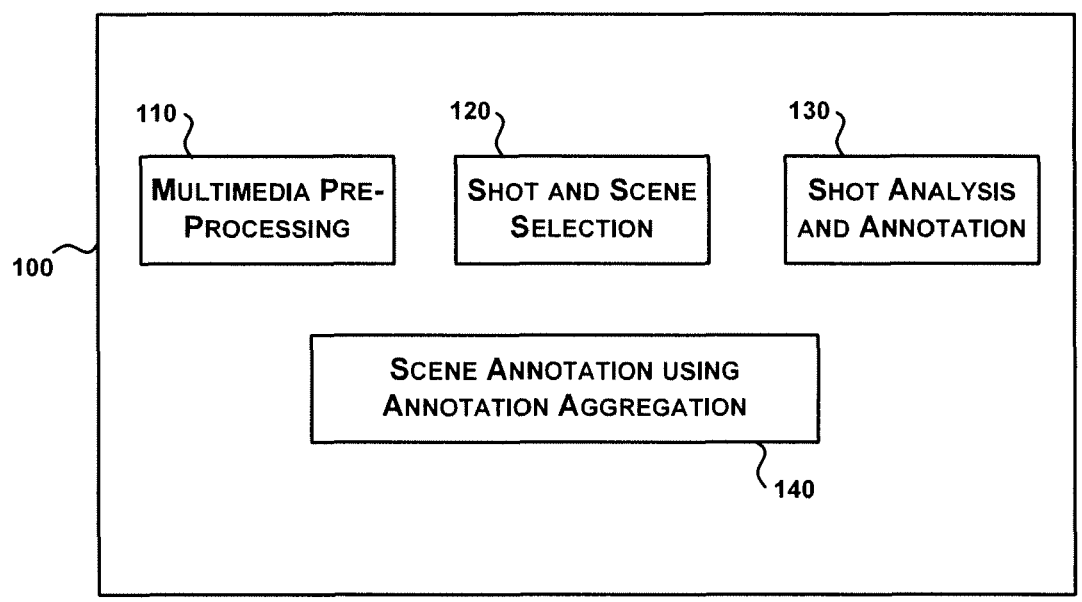
FIG. 1: AN ILLUSTRATIVE SCENE ANNOTATION

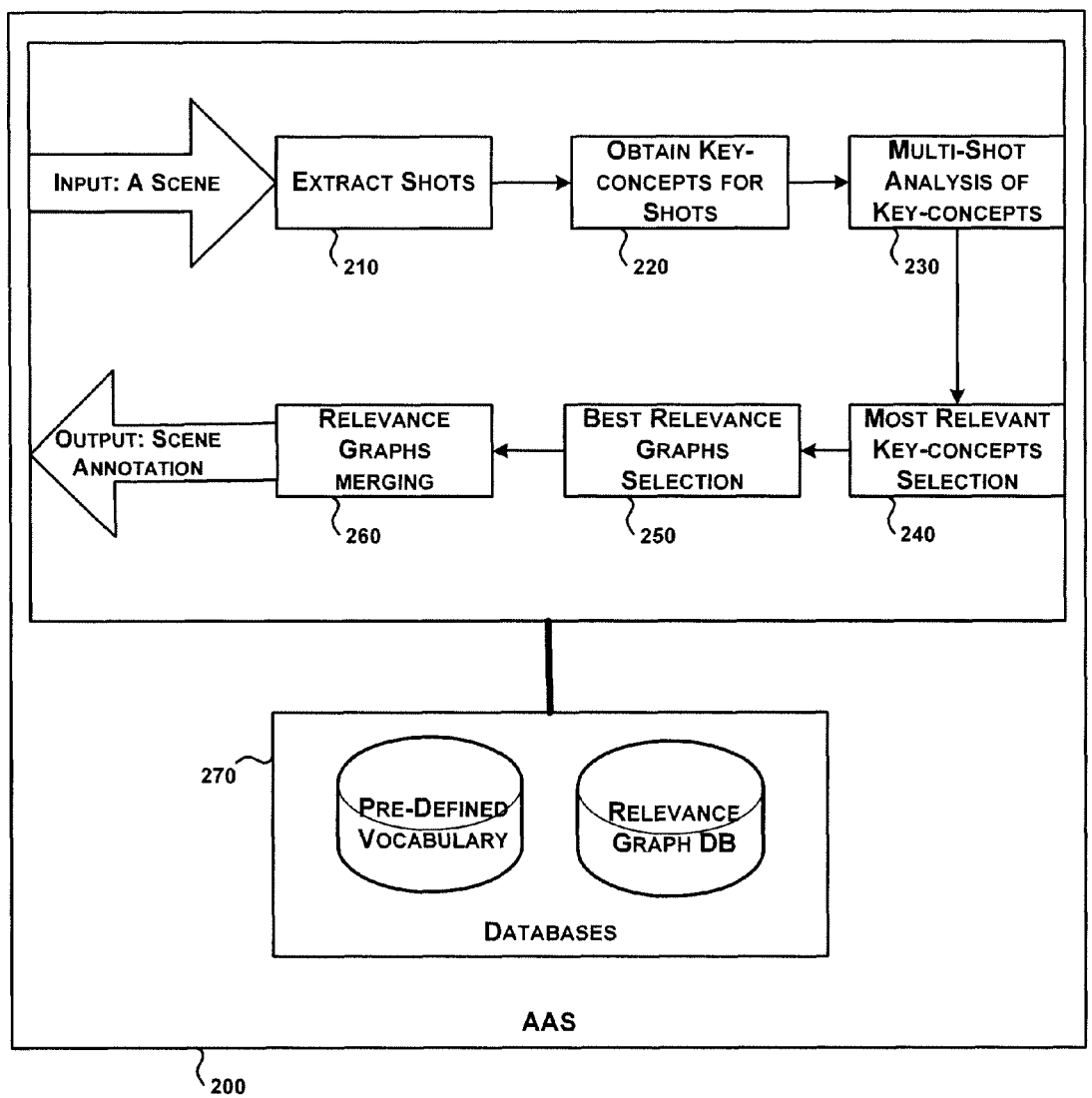
FIG. 2: ANNOTATION AGGREGATION SYSTEM

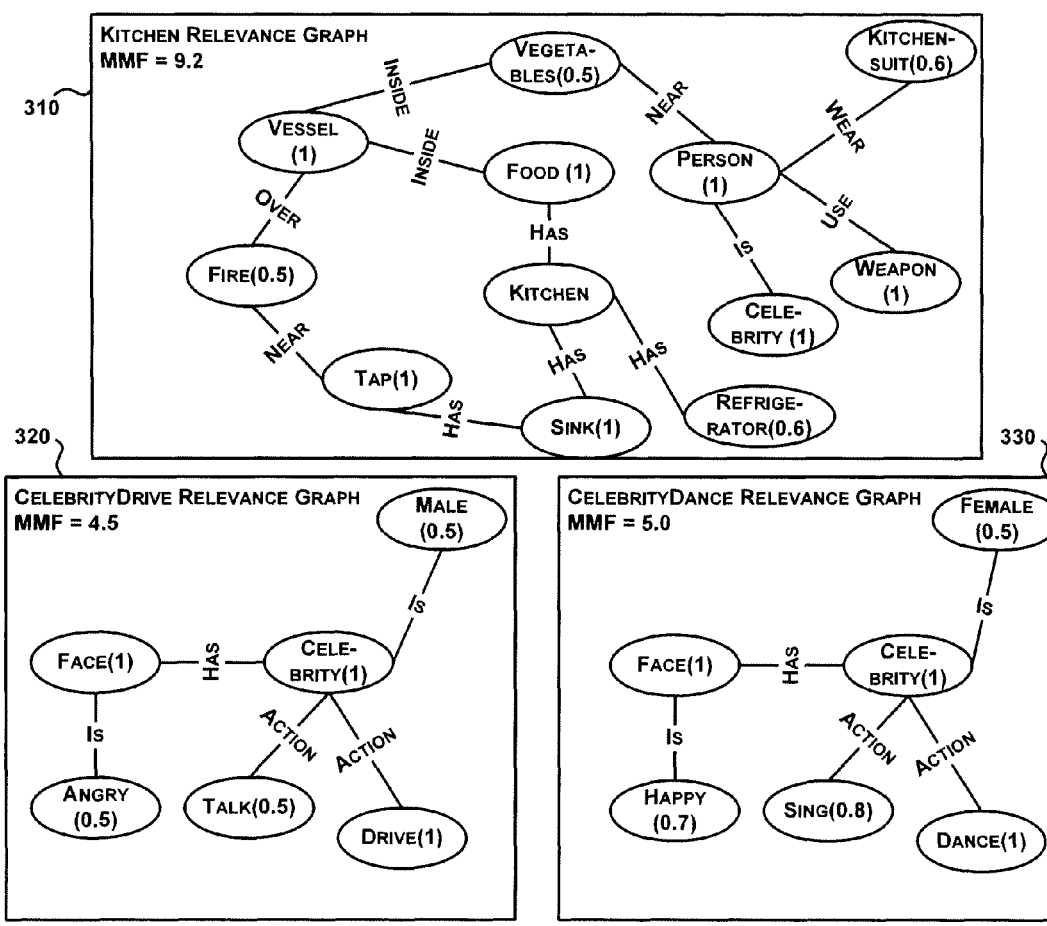
FIG. 3: AN ILLUSTRATIVE FIXED VOCABULARY AND RELEVANCE GRAPHS

ALGORITHM RELEVANT KEY-CONCEPTS SELECTION

OBJECTIVE:
　TO ANALYZE A PLURALITY OF KEY-CONCEPTS ASSOCIATED WITH A PLURALITY OF SHOTS OF A SCENE TO DETERMINE THE MOST RELEVANT KEY-CONCEPTS

INPUT:
　SC IS AN INPUT SCENE;
　SHS = {SH1, SH2, ..., SHn} IS A SET OF SHOTS ASSOCIATED WITH SC;
　SKCi = {KCi1, KCi2, ..., KCi(Pi)} IS A SET OF Pi KEY-CONCEPTS RELATED TO SHOT SHi WITH KCij BEING ASSOCIATED WEIGHT Wij, WHEREIN THE WEIGHT DENOTES THE RECOGNITION ACCURACY OF THE CORRESPONDING OBJECT IN THE KEY-FRAME OF SHi;
　KCS = {KC1, KC2, ..., KCx} IS THE UNION OF SKCi WITH 1 <= I <= N;

OUTPUT:
　MRSKC = {OKC1, OKC2, ..., OKCq}, A SUBSET OF KCS; NOTE THAT MRSKC IS A SET OF KEY-CONCEPTS THAT GETS ASSOCIATED WITH SCENE SC;

{
　FOR EACH KCi IN KCS
　　DETERMINE SHOTS SHi1, SHi2, ..., SHiK SUCH THAT KCi IS ASSOCIATED WITH EACH SUCH SHOT SHij;
　　LOCATE OBJECT Oij CORRESPONDING TO KCi IN EACH SHOT SHij;
　　LET Oi BE A SET OF ALL Oij'S;
　　FOR EACH Oij IN Oi
　　　COMPUTE OBJECT SIMILARITY MEASURE OF Oij WITH RESPECT TO EACH Oik IN Oi;
　　　COUNT Cij AS THE NUMBER OF OBJECTS IN Oi THAT ARE SIMILAR TO Oij;
　　　COMPUTE Mij AS THE MEAN OF THE Wik'S ASSOCIATED WITH THE OBJECTS IN Oi THAT ARE SIMILAR TO Oij;
　　　COMPUTE RFij AS THE PRODUCT OF Cij AND Mij;
　　DETERMINE THE MAXIMUM RELEVANT FACTOR RFim AND ASSOCIATE THE SAME WITH KCi;
　ARRANGE KEY-CONCEPTS IN KCS WITH RESPECT TO THEIR RFim'S;
　SELECT THE TOP PRE-DEFINED NUMBER OF KEY-CONCEPTS AS THE MOST RELEVANT KEY-CONCEPTS AND MAKE THE SAME PART OF MRSKC;
}

FIG. 4: RELEVANT KEY-CONCEPTS SELECTION

ALGORITHM RELEVANCE GRAPHS SELECTION

OBJECTIVE:
  TO ANALYZE A PLURALITY OF KEY-CONCEPTS ASSOCIATED WITH A SCENE TO DETERMINE A PLURALITY OF RELEVANCE GRAPHS

INPUT:
  SC IS AN INPUT SCENE;
  MRSKC = {OKC1, OKC2, ..., OKCq} IS THE SET OF KEY-CONCEPTS ASSOCIATED WITH SCENE SC WITH OKCi ASSOCIATED WITH WEIGHT WKCi;
  RGDB IS A DATABASE OF PRE-DEFINED RELEVANCE GRAPHS; NOTE THAT EACH GRAPH RGi IN RGDB IS AS FOLLOWS: A WEIGHT IS ASSOCIATED WITH EACH NODE AND EACH EDGE IN RGi; NODE WEIGHT OF A NODE INDICATES THE ROLE OF A KEY-CONCEPT ASSOCIATED WITH THE NODE IN A PARTICULAR RELEVANCE GRAPH SUCH AS WHETHER THE KEY-CONCEPT IS OPTIONAL OR MANDATORY; EDGE WEIGHT IS USED TO CAPTURE THE ROLE OF ALTERNATIVE KEY-CONCEPTS IN SUPPORTING A KEY-CONCEPT;

OUTPUT:
  BRSRG A SET OF RELEVANCE GRAPHS FROM RGDB; NOTE THAT EACH RG IN BRSRG IS A POSSIBLE ANNOTATION OF THE SCENE SC;

{
  FOR EACH RGi IN RGDB,
    LET SN BE THE SET OF NODES IN RGi WITH NODE Ni ASSOCIATED WITH WEIGHT WNi;
    LET SE BE THE SET OF EDGES IN RGi WITH EDGE Ei ASSOCIATED WITH WEIGHT WEi;
    COMPUTE MMF, MAXIMUM MATCH FACTOR, AS FOLLOWS:
      PERFORM RGi GRAPH TRAVERSAL GTj; THERE ARE MULTIPLE WAYS TO TRAVERSE RGi GRAPH;
      DURING TRAVERSAL FROM Ni TO Nj THROUGH Ek, ADD WNi * WEi TO WNj;
      ADD THE FINAL WEIGHTS ASSOCIATED WITH THE TERMINATING NODES DURING TRAVERSAL TO DETERMINE GTMFj;
      ASSOCIATE THE MAXIMUM OF GTMFj'S AS THE MMF OF RGi;
    CONSIDER EACH KEY-CONCEPT OKCi IN MRSKC AND BIND IT WITH THE BEST MATCHING NODE Nj IN RGi;
    DURING BINDING, MULTIPLY WKCi WITH THE NODE WEIGHT WNj TO CHANGE THE WEIGHT OF Nj;
    COMPUTE MF, THE MATCH FACTOR OF RGi, BY TRAVERSING RGi IN THE BEST POSSIBLE MANNER WITH WEIGHTS OF UNBOUND NODES REDUCED TO 0;
    COMPUTE NMFi, THE NORMALIZED MATCH FACTOR ASSOCIATED WITH RGi, AS MF/MMF;
  SELECT THOSE RELEVANCE GRAPHS WHOSE CORRESPONDING NORMALIZED MATCH FACTOR EXCEEDS A PRE-DEFINED THRESHOLD, AND MAKE THEM A PART OF BRSRG;
}

FIG. 4A: BEST RELEVANCE GRAPHS SELECTION

```
ALGORITHM MERGING PARTIAL RELEVANCE GRAPHS

OBJECTIVE:
   TO ANALYZE A PLURALITY OF RELEVANCE GRAPHS ASSOCIATED WITH A SCENE TO DETERMINE
   A MERGED RELEVANCE GRAPH

INPUT:
   SC IS AN INPUT SCENE;
   BRSRG IS THE SET OF BEST RELEVANCE GRAPHS ASSOCIATED WITH THE SCENE SC; NOTE
   THAT EACH RG IN BRSRG IS A POSSIBLE ANNOTATION OF THE SCENE SC;

OUTPUT:
   MRRG IS THE MERGED MOST RELEVANT RELEVANCE GRAPH TO DESCRIBE THE SCENE SC;

{
   FOR EACH RGI IN BRSRG
      FOR EACH RGJ IN BRSRG      // MERGE RGJ WITH RGI;
         FOR EACH NODE NJ IN RGJ
            IF WNJ <= 0, THEN IGNORE NJ;
            IDENTIFY THE CORRESPONDING NODE NI IN RGI;
            IF SO, SET WNI AS THE MAX OF WNI AND WNJ;
            IF THERE IS NO CORRESPONDING NODE IN RGI, THEN
               IF THERE IS A LINK WITH ONE OF THE NODES OF RGI, THEN RETAIN THE NODE NJ;
      COMPUTE MFI ASSOCIATED WITH THE MERGED RGI AS FOLLOWS:
         PERFORM RGI GRAPH TRAVERSAL GTJ; THERE ARE MULTIPLE WAYS TO TRAVERSE RGI
         GRAPH;
         DURING TRAVERSAL FROM NI TO NJ THROUGH EK, ADD WNI * WEI TO WNJ;
         ADD THE FINAL WEIGHTS ASSOCIATED WITH THE TERMINATING NODES DURING
         TRAVERSAL TO DETERMINE GTMFJ;
         ASSOCIATE THE MAXIMUM OF GTMFJ'S AS THE MFI OF RGI;
      SIMILARLY, COMPUTE MMFI OF RGI;
      FINALLY, COMPUTE NMFI AS MFI/MMFI;
   SELECT THE MERGED RELEVANCE GRAPH RGM WITH THE MAXIMUM NMFM AS MRRG;
}
```

FIG. 4B: MERGING RELEVANCE GRAPHS

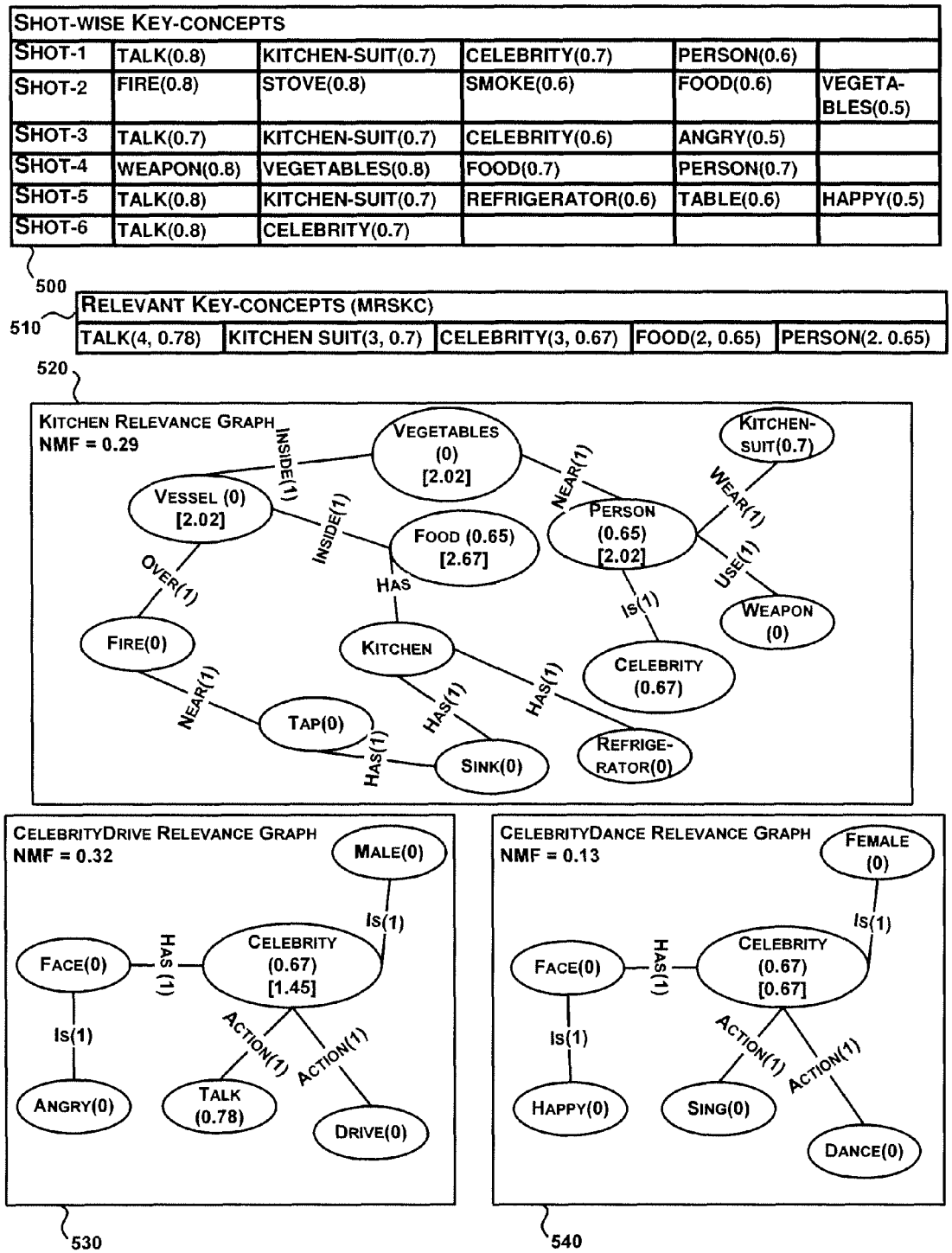
FIG. 5: ILLUSTRATIVE RESULTS RELATED TO RELEVANCE GRAPH SELECTION

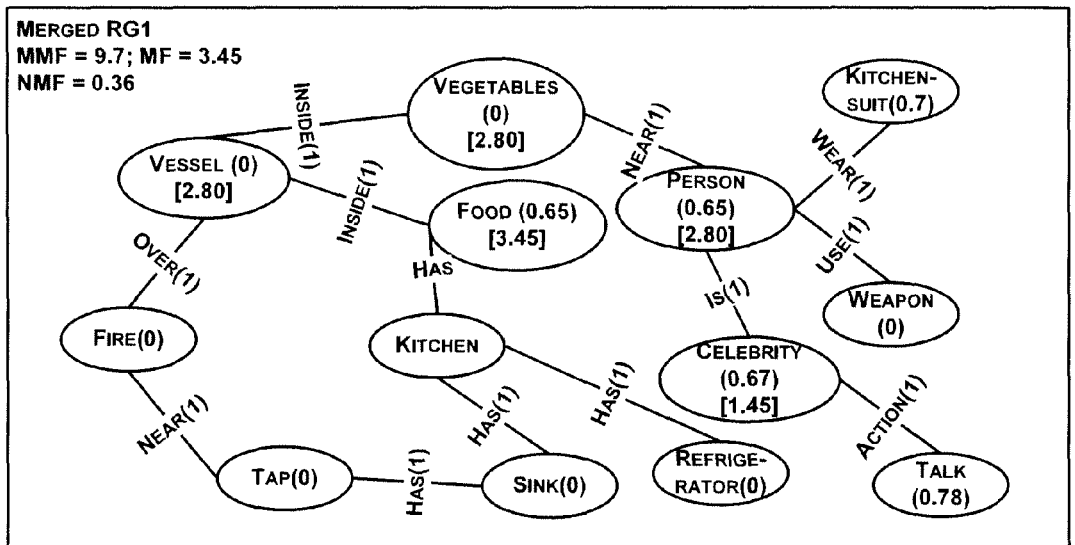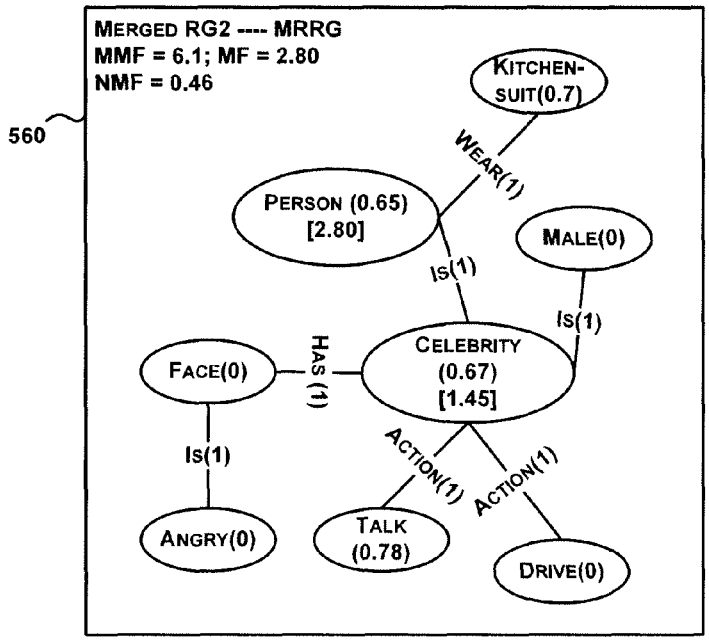
FIG. 5A: ILLUSTRATIVE RESULTS RELATED TO RELEVANCE GRAPHS MERGING

US 8,065,302 B2

SYSTEM AND METHOD FOR ANNOTATION AGGREGATION

FIELD OF THE INVENTION

The present invention relates to multimedia analysis in general and more particularly, multimedia analysis at multiple levels. Still more particularly, the present invention is related to a system and method for annotation aggregation of a multimedia content at a higher level based on the annotation of the multimedia content at a lower level.

BACKGROUND OF THE INVENTION

Content based multimedia search has gained a lot of attention with the rapid increase in multimedia quantity and quality. As the ability to broadcast video content (including games) has gone beyond television to the Internet and mobile phones, video advertising is becoming an attractive and plausible source of revenue. While today video advertising accounts for only a minuscule proportion of media budgets, it presents a significant opportunity for advertisers to extend the reach of their campaigns with compelling content. This demands to select relevant advertisements for targeting viewers based on the video content. There is a definitive need to determine the deeper semantics of the video and to select relevant advertisements based on the semantics. In order to provide a deeper semantics for a multimedia content, it is necessary to use the prevailing structure of the multimedia content effectively. For example, in computer vision, the processing is organized at various levels: low level, syntactic analysis, intermediate level, structural analysis, and high level semantic analysis. A typical medium to long duration multimedia is structured at various levels: shot level (small duration), scene level (not-so-small duration, and also represents a semantic unit), segment level (medium duration), multi-segment level (not-so-long duration), and full-length level (long duration). The challenge is to provide the multimedia content annotations at several of these levels. This is addressed by building upon the annotations at lower levels so that the system makes use of all of the available information based on the analysis up to that point and at the same ensuring that the annotations at various levels are consistent with each other. The present invention addresses the issue of providing annotations of a multimedia content at various levels and leading to a better characterization of the multimedia content.

DESCRIPTION OF RELATED ART

U.S. Pat. No. 7,398,261 to Spivack; Nova (San Francisco, Calif.), Thorisson; Kristinn R. (Reykjavik, I S) for "Method and system for managing and tracking semantic objects" (issued on Jul. 8, 2008 and assigned to Radar Networks, Inc. (San Francisco, Calif.)) describes methods and systems for managing and tracking semantic objects for the purposes of managing a semantic collection consisting of a set of semantic objects, creating a semantic link between the set of semantic objects, and identifying a set of rules to be associated with the semantic collection.

U.S. Pat. No. 7,340,458 to Vaithilingam; Gandhimathi (Briar Cliff Harbor, N.Y.), Abdel-Mottaleb; Mohamed S. (Ossining, N.Y.) for "Meta-descriptor for multimedia information" (issued on Mar. 4, 2008 and assigned to Koninklijke Philips Electronics N.V. (Eindhoven, N L)) describes a technique for generating meta-descriptors for multimedia information based on extracting the descriptors from the multimedia information, clustering the multimedia information based on the descriptors, assigning meta-descriptors to each cluster, and attaching the meta-descriptors to the multimedia information.

U.S. Pat. No. 6,961,954 to Maybury; Mark T. (Chelmsford, Mass.), Merlino, Jr.; Andrew E. (Burlington, Mass.) for "Automated segmentation, information extraction, summarization, and presentation of broadcast news" (issued on Nov. 1, 2005 and assigned to The Mitre Corporation (McLean, Va.)) describes a technique for automated analysis of multimedia, such as news broadcast, based on story segmentation and proper name extraction to select, condense, and then present news summaries.

U.S. Pat. No. 6,564,263 to Bergman; Lawrence David (Mt. Kisco, N.Y.), Kim; Michelle Yoonk Yung (Scarsdale, N.Y.), Li; Chung-Sheng (Ossining, N.Y.), Mohan; Rakesh (Stamford, Conn.), Smith; John Richard (New Hyde Park, N.Y.) for "Multimedia content description framework" (issued on May 13, 2003 and assigned to International Business Machines Corporation (Armonk, N.Y.)) provides a framework for describing multimedia content based on a description schema to facilitate content based search and indexing among other capabilities.

"System and Method for Bounded Analysis of Multimedia using Multiple Correlations" by Sridhar Varadarajan, Amit Thawani, and Kamakhya Prasad Gupta, (pending USPTO patent application and assigned to Satyam Computer Services Ltd.) describes a system and method for consistent combining of outcome of the multiple analyses techniques with respect to a segment of a multimedia using multiple correlations.

"Web-Style Multimedia Annotations" by Shaw, R. and Wilde, E. (appeared in the UCB iSchool Report (School of Information), 2007-014, August 2007) describes a declarative approach to multimedia annotations which represents annotations in an XML format independent from the multimedia resources.

"Next Generation Semantic Web Applications" by Motta, E. and Sabou, M. (appeared in the Proceedings of the Semantic Web—ASWC 2006, First Asian Semantic Web Conference, Beijing, China, 3-7 Sep. 2006, Lecture Notes in Computer Science, Vol. 4185, 2006) provides an approach for characterizing the nature of semantic web applications from the point of view of next generation of semantic web applications.

"Semi-Automatic Video Semantic Annotation Based on Active Learning" by Song, Y., Hua, X., Dai, l., and Wang, R. (appeared in the Proceedings of Visual Communications and Image Processing 2005, Beijing, China, 12-15 Jul. 2005) describes a novel semi-automatic annotation scheme for home videos based on active learning and feedback.

"Text-based Semantic Annotation Service for Multimedia Content in the Esperonto Project" by Declerck T., Contreras, J., Corcho, O., and Crispi, C. (appeared in the Proceedings of the European Workshop on the Integration of Knowledge, Semantic and Digital Media Technologies (EWIMT 2004), 25-26 Nov. 2004, London) describes an approach for the integration of natural language processing, ontologies, and other knowledge bases for providing semantic annotation service and specifically elaborates processing of text material associated with still images in web pages.

"Semi-automatic semantic annotation of images using machine learning techniques" by Marques, O. and Barman, N. (appeared in the Proceedings of International Semantic Web Conference (ISWC), Samibel Island, Fla., 20-23 Oct. 2003) describes an intelligent approach for semantic annotation of images.

"MECA: an Extensible, Expressive System and Language for Statically Checking Security Properties" by Yang, J., Kremenek, T., Xie, Y., and Engler, D. (appeared in the Proceedings of the 10th ACM Conference on Computer and Communications Security (CCS'03), Oct. 27-31, 2003, Washington, D.C., USA) describes a system and annotation language for checking security rules.

The known systems do not address the various issues related to the aggregation of a plurality of key-concepts describing the portions of a multimedia content to arrive at a more holistic description of the multimedia content. The present invention provides a system and method for addressing these issues in order to effectively arrive at a comprehensive description of the multimedia content.

SUMMARY OF THE INVENTION

The primary objective of the invention is to determine an aggregated annotation of a multimedia content based on the annotation of a plurality of segments of the multimedia content.

One aspect of the invention is to obtain a plurality of key-concepts for each of a plurality of segments of a multimedia content.

Another aspect of the invention is to analyze a plurality of key-concepts to select a most relevant subset of the plurality of key-concepts based on the multiple associations of a key-concept across multiple segments of a multimedia content and the similarity of the corresponding multimedia objects in the multimedia content.

Yet another aspect of the invention is to define and use the notion of relevance graphs in annotating a multimedia content.

Another aspect of the invention is to determine a plurality of best relevance graphs based on the matching of a plurality of key-concepts with respect to a plurality of relevance graphs.

Yet another aspect of the invention is to merge a plurality of relevance graphs to determine the most relevant relevance graph.

BRIEF DESCRIPTION OF THE DRAWINGS

FIG. 1 depicts an illustrative scene annotation.

FIG. 2 provides an overview of Annotation Aggregation System.

FIG. 3 depicts illustrative data related to fixed vocabulary and relevance graphs FIG. 4 provides an approach for relevant key-concepts selection.

FIG. 4a provides an approach for best relevance graphs selection.

FIG. 4b provides an approach for relevance graphs merging.

FIG. 5 depicts illustrative results related to relevance graphs selection.

FIG. 5a depicts illustrative results related to relevance graphs merging.

DETAILED DESCRIPTION OF THE PREFERRED EMBODIMENTS

A multimedia content can be viewed as made up of segments, scenes, and shots. This hierarchical structure depicts a full multimedia content comprising multiple segments with each segment comprising multiple scenes, and finally, each scene comprising multiple shots. From content point of view, a shot is a syntactic unit while a scene is a semantic unit. When shot annotations are available, it is a challenge to arrive at annotations at scene level as this demands a complex semantic analysis. One of the useful assumptions to make to address this complexity is a closed world assumption: in this case, closed world means fixing of vocabulary and fixing of semantics with respect to the closed world. A case in point is ad targeting: define the vocabulary (that is syntax) with ad targeting in mind, and define the semantics keeping ad relevance in mind. While such a closed world assumption may not be satisfactory, it is quite effective especially for ad targeting. One of the issues is to arrive at a scene level annotation given annotations of the contained shots: this is the notion of annotation aggregation that involves combining individual shot level annotations. In case the annotations of shots are also based on closed world assumption (say for ad targeting), the problem of defining a scene semantics is based on such relevance based key-concepts. The relevance based key-concepts at shot level lead naturally to defining semantic relevance at scene level. Such relevance semantics is defined based on relevance graphs FIG. 1 depicts an illustrative scene annotation. The procedure for annotation of a multimedia content (100) views the multimedia content to be comprising of shots and scenes. In particular, a scene is said to consist of a plurality of shots. The first step is multimedia preprocessing (110). Subsequent to preprocessing, various shot and scene boundaries are identified (120). The next step is to annotate each of the identified shots (130). A particular way of achieving this step is to identify a key-frame of a shot and annotate the shot based on the analysis of the key-frame. This is described in the patent application submitted to USPTO: System and Method for Bounded Analysis of Multimedia using Multiple Correlations (pending USPTO patent application to Sridhar Varadarajan, Amit Thawani, and Kamakhya Prasad Gupta, and assigned to Satyam Computer Services Ltd.). Finally, the annotation of a scene is based on the aggregation of annotations associated with the shots of the scene (140).

FIG. 2 provides an overview of Annotation Aggregation System (AAS). Input to AAS is a scene that is a part of a multimedia content. AAS analyzes the input scene with the help of databases to annotate the scene (200). Specifically, the input is analyzed to extract the shots (210). For each shot, a set of key-concepts is obtained (220). Multi-shot analysis of key-concepts is performed (230) to determine the most relevant key-concepts (240). Specifically, each shot is associated with a set of key-concepts and the multi-shot analysis helps in identifying the most relevant key-concepts based on the notion of multi-shot occurrence of an object associated with a key-concept. Based on the set of most relevant key-concepts, Relevance Graph Database (RG DB) is accessed to select the best matching relevance graphs (250). In many cases, the selection is based on the normalized match being greater than a pre-defined threshold value leading to the identification of a plurality of best matching relevance graphs. Hence, in the next step (260), a subset of this plurality of best matching relevance graphs is merged. The merged relevance graph with the maximum normalized match factor is used to annotate the input scene. The closed world assumption is based on the usage of a pre-defined vocabulary database and a set of relevance graphs that is based the pre-defined vocabulary database (270).

FIG. 3 depicts an illustrative fixed vocabulary and relevance graphs. The fixed vocabulary (300) provides a set of entities that signifies key-concepts to be used in scene annotation. Such a pre-defined fixed vocabulary helps in enforcing the closed world assumption. A relevance graph is described using a set of nodes and set of edges (alternatively, links) wherein each node stands for a key-concept and each edge interconnecting two nodes stands for a key-concept elaborating the relationship between the two nodes. Both nodes and edges are weighted leading to a node-weighted and edge-weighted graph. The node-weight of a node, a value between 0 and 1, indicates the relevance contribution of the node towards the concept represented by the graph. The relevance graphs (310, 320, and 330): Kitchen relevance graph is the relevance based description of the key-concept "kitchen." Note that while the key-concept could be semantically described in an even more elaborated manner, from the relevance for ad targeting, the key-concept gets described in a close-bounded manner. Similarly are the CelebrityDrive and CelebrityDance relevance graphs.

FIG. 4 provides an approach for relevant key-concepts selection. The main objective of this algorithm is to analyze a plurality of key-concepts associated with a plurality of shots associated with an input scene to determine the most relevant key-concepts. Let SC be an input scene; further, let SHS be a set {SH1, SH2, ..., SHn} be the N shots that are part of SC. Let SKCi be a set {KCi1, KCi2, ..., KCi(pi) be a set of Pi key-concepts associated with the shot SHi with KCij being associated with weight Wij, wherein Wij denotes the recognition accuracy of the corresponding object in the key-frame of SHi. Finally, let KCS={KC1, KC2, ..., KCx} be the set of union of SKCi with 1<=I<=N. The output of the algorithm is MRSKC={OKC1, OKC2, ..., OKCo} a subset of KCS and note that MRSKC is a set of key-concepts that gets associated with the scene SC.

For each KCi in KCS, do the following steps:
Step 1: Determine the shots SHi1, SHi2, ..., SHik such that KCi is associated with each such shot SHij;
Step 2: Locate object Oij corresponding to KCi in each shot SHij;
Step 3: Let Oi be the set of all Oij's;
Step 4: For each Oij in Oi,
Step 4a: Compute object similarity measure of Oij with respect to each Oik in Oi;
Step 4b: Count Cij as the number of objects in Oi that are similar to Oij;
Step 4c: Compute Mij as the mean of Wij's associated with the objects in Oi that are similar to Oij;
Step 4d: Compute RFij, a relevant factor of the key-concept KCi as the product of Cij and Mij;
Step 5: Determine the maximum relevant factor RFim and associate the same as the relevant factor of the key-concept KCi;
Arrange key-concepts in KCS with respect to their RFim's;
Select the top pre-defined number of key-concepts as the most relevant key-concepts and make the same part of MRSKC.

FIG. 4a provides an approach for the selection of best relevance graphs. The objective of this algorithm is to analyze a plurality of key-concepts associated with a scene to determine a plurality of relevance graphs. Let SC be an input scene. MRSKC={OKC1, OKC2, ..., OKCo} be the set of key-concepts associated with the scene SC with the weight WKCi associated with OKCi; RGDB is a database of pre-defined relevance graphs. Note that each graph RGi in RGDB is associated with both node weights and edge weights: that is, each node is associated with a weight and indicates the role of the key-concept associated with the node in a particular relevance graph such as whether the key-concept is optional or mandatory; and similarly, each edge is associated with a weight and indicates the role of alternative key-concepts in supporting the key-concept. The output of the algorithm is BRSRG, a set of best relevance graphs with each relevance graph in BRSRG a possible annotation of the scene SC.

For each RGi in RGDB,
Step 1: Let SN be the set of nodes in RGi with node Ni associated with weight WNi;
Step 2: Let SE be the set of edges in RGi with edge Ei associated with weight WEi;
Step 3: Compute MMF, maximum match factor, as follows:
Step 3a: Perform Rgi graph traversal GTj; There are multiple ways to traverse RGi graph;
Step 3b: During traversal from Ni to Nj through Ek, Add WNi*WEi to WNj;
Step 3c: Add the final weights associated with the terminating nodes during traversal to determine GTMFj;
Step 3d: Associate the maximum of GTMFj's as the MMF of RGi;
Step 4: Consider each key-concept OKCi in MRSKC and bind it with the best matching node Nj in RGi;
Step 5: During binding, multiply WKCi with the node weight WNj to change the weight of Nj;
Step 6: Compute MF, the match factor of RGi, by traversing RGi in the best possible manner with weights of unbound nodes reduced to 0;
Step 7: Compute NMFi, the normalized match factor associated with RGi, as MF/MMF;
Select those relevance graphs whose corresponding normalized match factor exceeds a pre-defined threshold, and make them a part of BRSRG.

FIG. 4b provides an approach for relevance graphs merging. The objective of this algorithm is to analyze a plurality of relevance graphs associated with a scene to determine the merged most relevant relevance graph. Let SC be an input scene. BRSRG is the set of best relevance graphs associated with the scene SC; note that each RG in BRSRG is a possible annotation of the scene SC. The output of the algorithm is the merged most relevant relevance graph, MRRG, that is used to annotate the scene SC.

For each RGi in BRSRG
Step 1: For each RGj in BRSRG//Merge RGj with RGi;
Step 1A: For each node Nj in RGj
Step 1Aa: If WNj<=0, Then Ignore Nj;
Step 1Ab: Identify the corresponding node Ni in RGi;
Step 1Ac: If so, Set WNi as the max of WNi and WNj;
Step 1Ad: If there is no corresponding node in RGi, Then If there is a link with one of the nodes of RGi, then retain the node Nj;
Step 2: Compute MFi associated with the merged RGi as follows:
Step 2A: Perform RGi graph traversal GTj; There are multiple ways to traverse RGi graph;
Step 2B: During traversal from Ni to Nj through Ek, Add WNi*Wei to WNj;
Step 2C: Add the final weights associated with the terminating nodes during traversal to determine GTMFj;
Step 2D: Associate the maximum of GTMFj's as the MFi of RGi;
Step 3: Similarly, Compute MMFi of RGi;
Step 4: Finally, Compute NMFi as MFi/MMFi;
Select the merged relevance graph RGm with the maximum NMFm as MRRG.

FIG. 5 depicts illustrative results related to relevance graphs selection. As an illustration, consider a scene with six shots (500). Each of these shots is annotated using a set of key-concepts. For example, Shot-1 is annotated using the set of key-concepts {Talk, Kitchen suit, Celebrity, Happy} with each such key-concept being associated with recognition accuracy. Multiple shot analysis leads to the selection of relevant key-concepts and the selection is based on the relevant factors (RFs) associated with the key-concepts (510). For example, the key-concept Talk is associated with four shots with an average recognition accuracy of 0.78 and RF of 3.12. For the illustration under consideration, the set {Talk, Kitchen suit, Celebrity, Food, Person} form part of MRSKC (the relevant key-concepts). Given this set of relevant key-concepts, each of the key-concepts is bound with the best matching node of the various RGs. For example, key-concept binding with various nodes of Kitchen RG (520) depicts Celebrity node with a computed weight of 0.67, and Food node with a computed weight of 2.67. The computed Max Match Factor (MMF) associated with Kitchen RG is 9.2 while the computed Match Factor (MF) is 2.67 resulting in the NMF of 0.29. Similarly, the computed NMF for CelebrityDrive RG is 0.32 (530) while the computed NMF for CelebrityDance RG is 0.13 (540). Based on the computed NMF values, Kitchen RG and CelebrityDance RG form part of BRSRG.

FIG. 5a depicts illustrative results related to relevance graphs merging. CelebrityDance RG is merged with Kitchen RG resulting Merged RG1 (550). Note that MMF, MF, NMF values are respectively 9.7, 3.45, and 0.36. On the other hand, Merged RG2 is the result of merging Kitchen RG with CelebrityDance RG (560) with MMF, MF, and NMF values respectively being 6.1, 2.8, and 0.46. Hence, Merged RG2 with a higher NMF value is the MRRG. The textual description of this relevance semantics is "A talking celebrity person wearing a kitchen suit" and this kind of information is used to target ads such as (a) ads branded by Celebrity; and (b) ads related to kitchen.

Thus, a system and method for annotation aggregation based on a set of key-concepts associated with each of a plurality of multimedia segments is disclosed. Although the present invention has been described particularly with reference to the figures, it will be apparent to one of the ordinary skill in the art that the present invention may appear in any number of systems that combines individual annotations in a hierarchical manner. It is further contemplated that many changes and modifications may be made by one of ordinary skill in the art without departing from the spirit and scope of the present invention.

What is claimed is:

1. A computer-implemented method for an aggregated annotation of a multimedia content based on a plurality of key-concepts associated with a plurality of segments of said multimedia content, and a plurality of relevance graphs, said method comprising:

selecting a key-concept from said plurality of key-concepts;

determining a plurality of key-concept segments of said plurality of segments;

wherein said key-concept is associated with each of said plurality key-concept segments;

locating a plurality of key-concept objects in said plurality of key-concept segments, wherein each of said plurality of key-concept objects corresponds with said key-concept;

selecting a key-concept object from said plurality of key-concept objects;

computing a count of number of objects in said plurality of key-concept objects that are similar to said key-concept object;

determining a plurality of recognition accuracies of said key-concept with respect to a plurality of key-concept similar objects, wherein each of said key-concept similar objects is similar to said key-concept object;

computing a mean value based on said plurality of recognition accuracies;

computing a relevant factor of a plurality of relevance relevant factors of said key-concept with respect to said key-concept object of said plurality of key-concept objects based on said count and said mean value;

computing a maximum relevant factor of a plurality of maximum relevant factors of said key-concept based on said plurality of relevant factors, wherein said plurality of maximum relevance factors is associated with said plurality of key-concepts;

computing a plurality of most relevant key-concepts based on said plurality of maximum relevant factors;

selecting a relevance graph from said plurality of relevance graphs;

computing a max match factor based on said relevance graph;

binding a key-concept of said plurality of most relevant key-concepts with a best matching node of said relevance graph;

determining a key-concept weight associated with said key-concept based on said plurality of maximum relevant factors;

determining a node weight associated with said best matching node;

updating said relevance graph based on multiplying said node weight with said key-concept weight resulting in an updated relevance graph;

making said updated relevance graph a part of said plurality of relevance graphs;

setting of weight of each of a plurality of unbound nodes of said updated relevance graph to zero;

computing a match factor based on said updated relevance graph;

computing a normalized match factor of a plurality of normalized match factors based on said match factor and said max match factor, wherein said plurality of normalized match factors is associated with said plurality of relevance graphs;

computing a plurality of best relevance graphs based on said plurality of relevance graphs and said plurality of normalized match factors;

selecting a first relevance graph from said plurality of best relevance graphs;

selecting a second relevance graph from said plurality of best relevance graphs;

selecting a first node associated with a first node weight from said first relevance graph, wherein said first weight node is greater than zero;

determining a second node associated with a second node weight in said second relevance graph, wherein said second node corresponds with said first node;

computing a revised node weight based on said first node weight and said second node weight;

updating said first node weight based on said revised node weight;

determining a third node of said second relevance graph, wherein said third node has an edge with a node of second relevance graph, wherein said node corresponds with a node of said first relevance graph;

making said third node a part of said first relevance graph;

computing a merged graph normalized match factor of a plurality of merged graph normalized match factors based on said plurality of best relevance graphs, wherein said plurality of merged graph normalized match factors is associated with said plurality of best relevance graphs; and computing using a computer, a most relevant relevance graph based on said plurality of best relevance graphs and said plurality of merged graph normalized match factors, wherein said most relevant relevance graph is said aggregated annotation of said multimedia content.

2. The method of claim 1, wherein said computing said plurality of most relevant key-concepts further comprising:
arranging said plurality of key-concepts based on a maximum relevant factor of said plurality of maximum relevant factors associated with each of said plurality of key-concepts into a plurality of arranged key-concepts; and
selecting a pre-defined number of key-concepts from the top of the said plurality of arranged key-concepts as said plurality of most relevant key-concepts.

3. The method of claim 1, wherein said computing said max match factor further comprising:
performing a traversal of a plurality of traversals of said relevance graph;
determining a source node of said relevance graph during said traversal, wherein said source node is associated with a source weight;
determining a destination node of said relevance graph during said traversal, wherein said destination node is associated with a destination weight;
determining an edge of said relevance graph connecting said source node and said destination node, wherein said edge is associated with an edge weight;
computing a new weight based on said source node weight, said destination node weight, and said edge weight;
computing a plurality of new weights associated with a plurality of terminating nodes associated with said traversal;
computing a graph traversal match factor based on said plurality of new weights;
computing a plurality of graph traversal match factors based on said plurality of traversals of said relevance graph; and
computing said max match factor based on said plurality of graph traversal match factors.

4. The method of claim 1, wherein said computing said match factor further comprising:
performing a traversal of said relevance graph;
determining a source node of said relevance graph during said traversal, wherein said source node is associated with a source weight;
determining a destination node of said updated relevance graph during said traversal, wherein said destination node is associated with a destination weight;
determining an edge of said updated relevance graph connecting said source node and said destination node, wherein said edge is associated with an edge weight;
computing a new weight based on said source node weight, said destination node weight, and said edge weight;
computing a plurality of new weights associated with a plurality of terminating nodes associated with said traversal;
determining a graph traversal match factor based on said plurality of new weights;
computing a plurality of graph traversal match factors based on a plurality of traversals of said relevance graph; and
computing said match factor based on said plurality of graph traversal match factors.

5. The method of claim 1, wherein said computing said plurality of best relevance graphs further comprising:
arranging said plurality of relevance graphs based on said plurality of normalized match factors into a plurality of arranged relevance graphs; and
selecting a predefined number of relevance graphs from the top of said plurality of arranged relevance graphs as said plurality of best relevance graphs.

6. The method of claim 1, wherein said computing said merged graph normalized match factor of said plurality of merged graph normalized match factors further comprising:
computing a match factor based on said first relevance graph;
computing a max match factor based on said first relevance graph; and
computing said merged graph normalized match factor of said first relevance graph based on said match factor and said max match factor.

7. The method of claim 1, wherein said computing said most relevant relevance graph further comprising:
arranging said plurality of best relevance graphs based on said plurality of merged graph normalized match factors into a plurality of arranged merged graphs; and
selecting a merged graph from said plurality of arranged merged graphs as said most relevant relevance graph, wherein said merged graph is in the top of the said plurality of arranged merged graphs.

* * * * *